Nov. 26, 1946.  G. M. FERGUSON  2,411,825
TWEEZER
Filed Dec. 11, 1943

INVENTOR.
George M Ferguson.
BY G. F. McDougall.
Attorney

Patented Nov. 26, 1946

2,411,825

UNITED STATES PATENT OFFICE 2,411,825

TWEEZERS

George M. Ferguson, Portland, Oreg.

Application December 11, 1943, Serial No. 513,872

3 Claims. (Cl. 81—43)

This invention relates to tweezers of which there are several kinds, for example toilet tweezers, jeweler and watch maker tweezers, and so on. The first kind will have normally open jaws, the second normally closed jaws.

The current art has so far as known always made tweezers of all metal construction, which involved making the blades springy and thin. If the loop or spring part was thin, it must have spring temper and then when the jaws were brought together they first closed, then separated, detracting from their usefulness.

The object of the present invention is to produce a form of tweezers wherein the blades can be and preferably are sufficiently rigid so that one can grasp an object with firmness, such as when removing a splinter. The blades will be preferably of tempered steel and so formed that they do not yield enough to lose their grip.

Another object is high availability with low cost of manufacture.

A still further object is a construction wherein accurate registry of the tweezer blade will be permanent.

The invention is to be found in holding two blades, preferably of tempered steel, in a head of rubber, reclaimed rubber or any substance having the well known characteristics of rubber; the word "rubber" as used herein being employed in the broad sense.

A drawing showing three forms of tweezers having blades made up into a rubber head and wherein all of the flexing necessary to bring the points of the blades firmly into contact with an object is to be deemed as residing in the head, accompanies and forms a part hereof.

Figure 2:
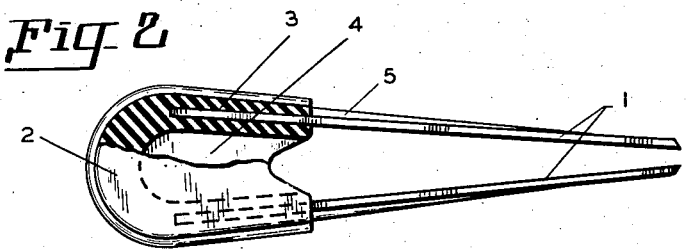
Fig. 2 shows a side view, partly in section, of the structure shown in Fig. 1.
Figure 1:
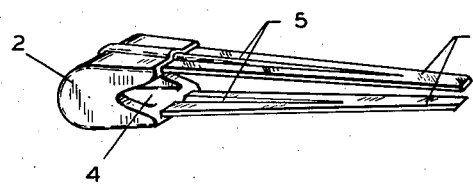
Fig. 1 is a perspective view of a tweezers structure embodying the invention.

Further describing the drawing: The blade members 1 are ribbed at 5 for stiffness and the ends opposite the points of each blade are embedded in a resilient rubber head 2.

The blades will be spaced apart at both ends as shown and concurrently moulded into the head 2 and vulcanized the procedure for which is well known. The free ends of the blades are closable together to pick up an object when finger pressure is applied thereto, by yielding of the resilient rubber head rather that of the blades. The embedded ends are shown in Fig. 2 at 3.

Figure 3:
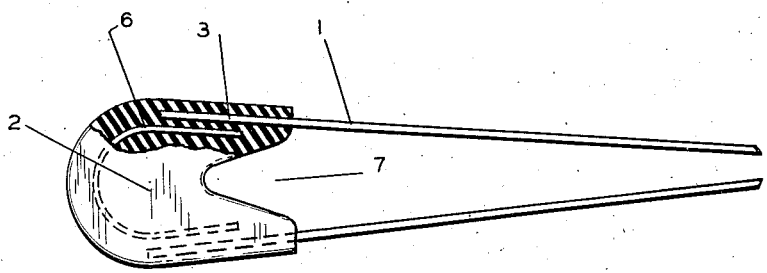
Fig. 3 is a section in part of a modification of the device shown in Fig. 1.

The modification of Fig. 3 consists in adding a reinforcing spring steel loop 6 wholly embedded in the head 2 and likewise vulcanized to the rubber. The head is shown to have an interior space 4 between the blades 1 which may be supplemented by an open space 7. The loop 6 is for reinforcing the head 2 so that the blades 1 will be constrained to open and close in the same plane.

As to cost, in quantity production the blades, especially those of the type shown in Fig. 3, can be stamped from proper sheets with great rapidity, heat treated in bulk and then assembled in multiple moulds which at the same time serve as jigs for proper placement in the rubber heads. The heads may or may not be buffed after they are vulcanized, but at any rate an exceptionally effective tool is thought possible at a highly competitive cost of production.

Having fully disclosed my invention, what I claim as new and desire to secure by Letters Patent, is:

1. Tweezers comprising a rubber head member, a pair of blade members, one end of each blade being embedded in the head with the other ends thereof in registry alignment, said blades spaced apart by the head and held apart at their opposite ends by reason of placement in the head, said head member being resilient and having a space in the interior thereof between the blades adapting it to yield to pressure on the blades to bring the blades into contact.

2. Tweezers with blades having operative tips movable with respect to each other to grasp an object, comprising a pair of blade members spaced apart, a one piece resilient rubber head within which one end of each blade is embedded to hold both ends spaced apart and the head having a space in the interior thereof, between the blades, to render the head yieldable, the outer ends of the blades being movable together by pressure thereon to cause resilient yielding of the head.

3. Tweezers having blade members movable to grasp an article, comprising a pair of aligned blade members, a resilient rubber head member, one end of each blade member deeply embedded in said rubber head, the opposite ends normally open and closable into registry, the embedded ends spaced apart and a U shaped piece of metal reinforcing member wholly embedded in the rubber head with its ends between the embedded ends of the blades and spaced therefrom within the rubber.

GEORGE M. FERGUSON.